United States Patent
Muse

[11] 3,776,127
[45] Dec. 4, 1973

[54] ELECTRIC MEAT SMOKER
[75] Inventor: Edward T. Muse, Dallas, Tex.
[73] Assignee: Smoker Products, Inc., Dallas, Tex.
[22] Filed: June 16, 1972
[21] Appl. No.: 263,634

[52] U.S. Cl. .................................. 99/482, 99/425
[51] Int. Cl. ............................................. A23b 1/04
[58] Field of Search ..................... 99/480, 482, 481, 99/473, 229, 425

[56] References Cited
UNITED STATES PATENTS
| | | | |
|---|---|---|---|
| 2,338,156 | 1/1944 | Allen | 99/480 |
| 2,645,993 | 7/1953 | Voss | 99/480 |
| 2,842,043 | 7/1958 | Reuland | 99/482 |
| 3,096,706 | 7/1963 | Cardwell | 99/482 |
| 3,333,526 | 8/1967 | Kirkpatrick | 99/482 |

*Primary Examiner*—Robert W. Jenkins
*Attorney*—D. Carl Richards et al.

[57] ABSTRACT

A smoker type cooking apparatus having a cylindrical housing containing an electric heating element supported from the housing side wall beneath a cooking rack and a drip pan. A nestable tray is supported on the floor in cooperation with the heating element adapted to contain a combustible smoke generating material such as hickory. The grill and pan are commonly supported on a set of brackets affixed to the housing interior to permit easy removal, installation and cleaning. The housing is provided with means to provide upward ventilation through the unit to maintain the proper cooking atmosphere.

6 Claims, 5 Drawing Figures

PATENTED DEC 4 1973    3,776,127

ELECTRIC MEAT SMOKER

The present invention relates to a cooking device, and more particularly to an electrically heated smoker used for cooking meats and other foods.

One of the results of increased leisure time in today's society is a more casual approach to the preparation of meals. Outdoor cooking or "barbequeing" has become extremely popular. Along with the growing popularity of this type of cooking, the outdoor cook has looked for new and better ways to prepare his fare. No longer is the chef merely content to simply roast or broil meat over a bed of charcoal. Instead, these gourmets of the suburbs have turned to new and better cooking methods. One form of cooking which is popular is smoking. With this method, even the most inexperienced cook can, with the proper cooker, prepare a delicious, succulent entree.

Various cookers of the smoker type can be found in the prior art. The advantage of smoker cooking is that a desirable smoked flavor is imparted to the food without the necessity of a complicated rotisserie or manual turning, since the method is a low or moderate heat cooking method. Further, the juices from the meat are caught and vaporized to baste the meat to keep the meat moist and prevent dehydration. A drip pan containing water may also be supported above the heating element to provide additional moisture during the cooking process. Once the meat has been placed in the cooker, the cooker can be left substantially unattended until the meat is completely done.

Cookers for the preparation of smoke flavored meat generally include a covered housing containing a grill for supporting the meat during cooking. A pan is located beneath the grill and serves to catch the drippings and, if desired, a predetermined amount of water may be added to the pan to vaporize for added moisture during cooking. A heat source is located in the bottom of the housing beneath the water pan. To generate the flavor imparting smoke, a combustible material such as wood chips of hickory or mesquite are added near the heat source.

A fuel, such as charcoal, is commonly used as a source of heat, but various new cookers have been designed which utilize an electrical resistance heating element to provide the heat necessary to accomplish cooking. For example, U. S. Pat. No. 3,333,526 discloses a food cooker in which an electrical resistance heating element is maintained in a spaced apart relationship from the bottom wall by means of a noncombustible insulating member. The heating element and the insulating member are secured to the bottom of the container by suitable bolts or rivets. A rack on the interior of the container supports a pan which is utilized to hold the combustible wood chips.

The present invention provides a smoker of the general type disclosed above, having an electrical heating element disposed near the bottom of the smoker below a pan adapted to contain the smoke generating wood chips. The resistance heating element and the wood chip tray of the present invention are cooperable so that the wood chip tray is self-supported within the smoker in nestable relationship with the element, eliminating the bulky and hard to clean rack. Similarly, the cooking racks and water pan are supported on integral flanged brackets on the smoker interior for ease of installation, removal, and adjustability. The electrical heating element used with the present cooker is configured to yield maximum and uniform heating and smoke generation within the unit. Maintenance of the proper cooking atmosphere is ensured by vent openings near the bottom of the unit and at the top to provide good upward ventilation through the unit.

The above and other important objects and advantages of the present invention will become apparent from the following detailed description and drawings, in which.

Figure 1:
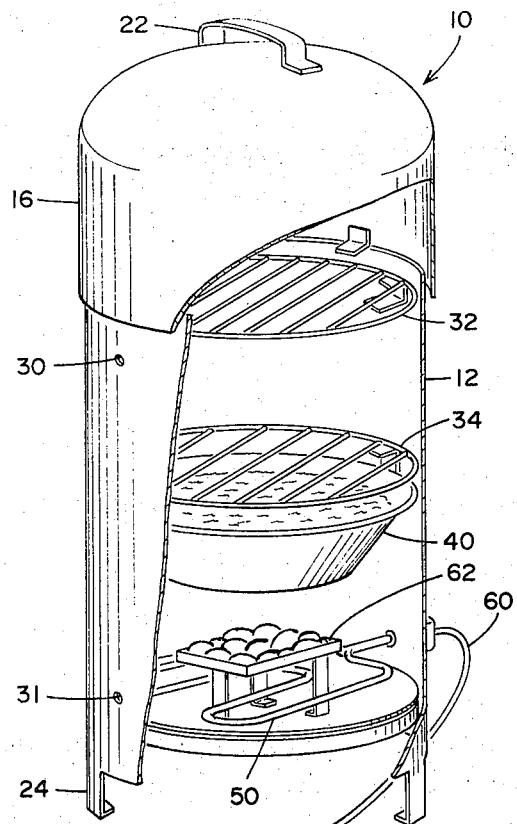
FIG. 1 is a perspective view, partly broken away, illustrating the preferred embodiment of the cooking apparatus of the present invention.
Figure 2:
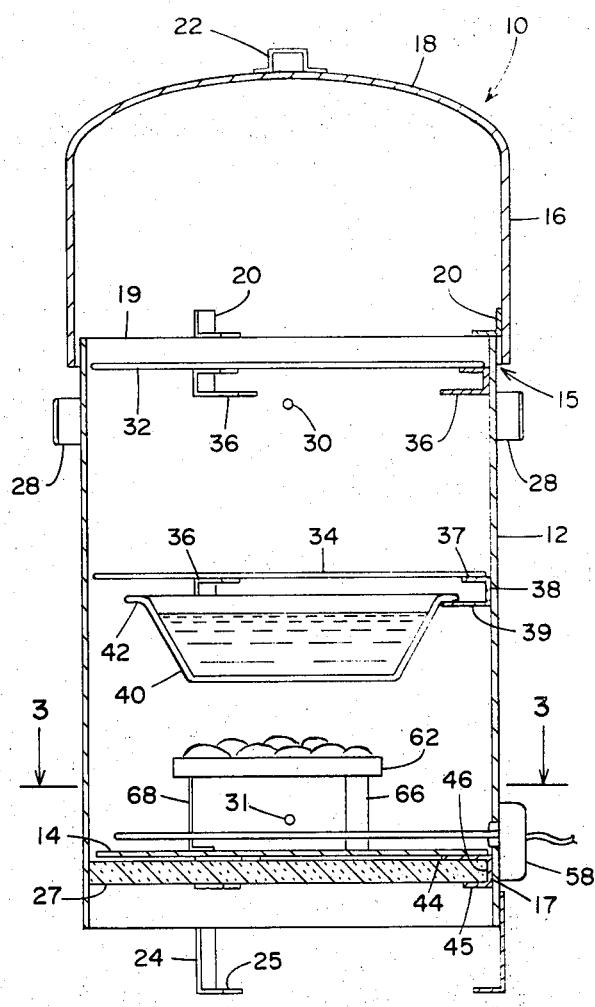
FIG. 2 is a sectional view showing the internal details of the cooker in side elevation.

Referring now to the drawings, particularly FIGS. 1 and 2, the cooker of the present invention is generally designated by the numeral 10 and comprises a generally cylindrical bottom housing member 12 having a substantially flat bottom wall 14 which is supported on brackets 17 welded to the interior of the housing. A removable cover or lid 16 cooperates to enclose the cooker.

The cover or lid 16 is preferably cylindrical and is domed at 18 to collect condensation as well as give the unit a pleasing appearance. Cover 16 is of a slightly larger diameter than housing 12 and, in place, rests on several metal tabs or flanges 20 which are welded in the interior of cover 16 and cooperate with the upper edge 19 of bottom section 12. A handle 22 is welded to the top center of domed portion 18 to facilitate removal and placement of the cover. Annular space 15 extends between the cover and housing and provides for a ventilating flow through the cooker. Additional ventilation aperture 30 near the upper edge 19 of the housing permits escape of a predetermined volume of smoke and steam emitted within the cooker to prevent overpressurization of the cooker and helps maintain a good cooking atmosphere in the unit. Lower vent hole 31 in the housing admits air into the unit to support combustion and ventilation as will be described in more detail hereafter.

Housing 12 of the cooker is supported at bottom edge by legs 24 which are preferably provided with ground engaging pads 25 to distribute the weight of the unit over a larger area and to give the unit better stability. Elevating the cooker 10 in this manner serves to reduce the heat effect on the supporting surface of the cooker. Accordingly, the cooker may be used outdoors, or indoors when the weather is inclement, and without damage to wooden patio decks or ordinary household floors. To further insulate the unit, an insulating pad 27 is affixed adjacent to the underside of floor 14 as will be explained hereafter.

A pair of handles 28 are oppositely disposed on the sides of housing 12 to permit the unit to be easily picked up and carried about. In this way, the unit is made portable and may be conveniently moved to a storage location when not in use. The housing 12 and cover 16 are preferably formed of a suitable cold rolled steel such as 18 or 20 gauge, and fabricated by conventional welding methods.

In the preferred embodiment, the cooker of the present invention supports two cooking grill racks 32 and 34, disposed one above the other in the housing 12 of the cooker. The racks are supported on a plurality of brackets 36 peripherally spaced on interior walls of section 12. Cooking racks 32 and 34 are easily removable from the unit for cleaning and access to the lower components of the cooker. The use of multiple racks, such as is shown, permits cooking of a larger quantity of meat, as both racks can be loaded simultaneously. The racks are conventionally designed and are preferably formed from a stainless steel or chrome-plated wire which are highly heat resistant and which have a series of parallel spaced apart bars on which the food to be cooked can be placed. As seen in FIG. 2, brackets 36 are provided with upper extending flange member 37 and a lower extending leg or flange member 39 joined by vertical intermediate section 38 which is secured to the tank interior by welding or similar methods. Upper flange 37 provides support for the cooking racks and lower flange 39 extends radially inwardly beyond the end of upper flange 37 and is adapted to support a drip catching pan 40.

Pan 40 is disposed below the lower cooking rack 34 and is arranged to catch and contain drippings and which may also contain a small amount of water for added moisture. Pan 40 has a peripheral lip 42 which rests on lower flange 39 of lower brackets 36. Brackets 36 thus are adapted to serve a dual purpose of supporting the cooking rack 34 as well as water pan 40. If only single upper cooking rack 32 is being used, the water pan and grill can, if desired, both be conveniently disposed and supported at upper bracket 36. The use of an integral bracket makes removal and cleaning of the grill components easy, as no extra bulk support racks are required. Further, the manufacture and fabrication of the unit is made more economical by this construction.

Figure 3:
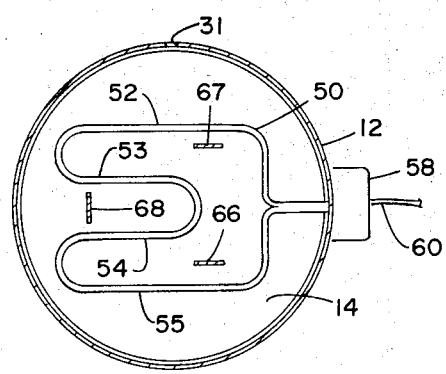
FIG. 3 is a sectional view taken along lines 3—3 of FIG. 2 with the tray removed, illustrating the heating element of the cooker of the present invention.
Figure 4:
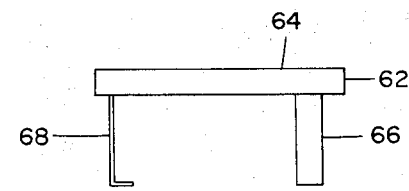
FIGS. 4 and 5 show in detail the container for the wood chips for generating the dense flavoring smoke.
Figure 5:
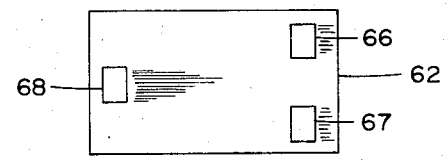

The heat for cooking is obtained from an electrical heating element 50 which is sized and selected to maintain a temperature within the cooker in the range of 275° to 325° F and would typically be rated at 1550 watts. The element is of a "W" shape and, as seen in FIG. 3, includes four interconnected generally parallel sections 52, 53, 54, and 55. The heating element 50 may be a plug-in type or may be permanently secured to a receptacle box 58 located on the unit exterior. An insulated line cord 60 extends from the receptacle box and is provided with a suitable plug for attachment to an electrical outlet.

The electrical element described is conveniently supported at the side of the unit at receptacle 58. Further, in accordance with good safety practice, all wiring and electrical components are easily accessible, not being located on the underside of the unit.

As mentioned above, brackets 17 are provided at spaced locations around the lower interior portion of the housing to support the floor 14. Brackets 17 are generally of a "U" shape having an upper extension member 44 which supports the floor and a lower extension or flange 45 spaced apart by intermediate section 46 which is welded to housing 12. Floor 14 is preferably of a slightly smaller diameter than the interior diameter of housing 12 and is spot welded to bracket members 44 so that air can infiltrate around the edges of floor 14 to further enhance ventilation. This is best seen in FIG. 2.

Circular insulation member 27 is removably secured in place against the exterior of bottom of floor 14 by lower member 45 of bracket 17. The insulating pad is preferably a fiberglass board backed with a metallic heat resistance material. The insulating pad serves to reduce the heat transferred from the bottom of the unit and will also absorb moisture and grease that may escape from around the edge of floor 14. The insulation is preferably pervious to allow air to pass through to the cooker, and should the insulation deteriorate or become saturated with grease, dirt, or moisture, a new pad may easily be replaced in brackets 17.

A wood pan or container 62 is supported within the cooker 10 at an elevation above the heating element and below pan 40. The wood container 62 comprises a metal tray portion 64 which is generally square, supported on legs 66, 67 and 68. The legs are conveniently formed from bar stock with the lower ends being bent ar right angles to the main portion to form a foot pad for better stability. It will be noted that the tray is provided with three legs, legs 66 and 67 being oppositely disposed at the sides of the tray and legs 68 being positioned along one edge of the tray. In this way, the tray may be placed in the bottom of portion 12 of the cooker with the legs resting on the smoker floor with the legs depending through the open spaces in the heating element 50 in nesting relationship. For example, with the wood tray properly in place, legs 66 and 67 would be located within the interior of the heating element between legs 52 and 55. The tray support leg 68 would be disposed between heating element sections 53 and 54. The tray is supported directly over the heating element and is completely surrounded by the heating element for efficient and complete combustion of the material placed on the tray for generation of the flavor imparting wood smoke. No bulky or additional racks are required within the smoker to support the wood tray. Removal of the tray is accomplished by simply lifting it out and it is replaced in the same manner.

The cooker of the present invention will be better understood from the following description of operation. When it is desired to prepare a selected meat such as a beef roast with a hickory smoked flavor, the cook will place a suitable quantity of hickory blocks or chips in the wood tray 62. For other flavors, other types of woods can be used such a mesquite or applewood. The tray is placed in the bottom of housing 12 with the legs of the tray nestled in cooperable relationship with the electric heating element 50. For example, an ordinary five pound beef roast will normally require approximately five coal size blocks of hickory to impart a desirable flavor. Pan 40, filled with several pints of water, is inserted into the cooker with its lip 42 supported at flange 36 of lower bracket 35. The lower grill or rack 34 is put in place on flange 46, followed by grill 32 supported at upper bracket 36. The quantity of meat to be cooked is then placed on rack 32. If a large quantity is to be cooked, both racks 32 and 34 would be utilized. The electrical heating element 50 is then energized by connecting line cord 60 to a source of electrical current. The electrical heating element heats the interior of the cooker to around 300° F and also will cause the wood in wood tray 62 to be heated to near the combustion point where the wood will smoulder, emitting a dense smoke which will penetrate and flavor the meat. Air is drawn into the unit around bottom 14 and at vent holes 31 and smoke and moisture are discharged around air space 15 and vent 30. The ventilation through the unit carries away excess moisture and smoke to maintain a good cooking environment. Since excess smoke and moisture is carried away, cleaning of the unit becomes less of a problem, as less residue collects in the housing. The water pan serves to maintain a moist environment within the cooker to prevent undesirable drying of the meat and further serves to catch fatty drippings which will also be vaporized and added to the smoke to flavor the meat. The pan also protects the meat on the grill from direct radiation from the heating element to further ensure a moist flavorful result.

During the cooking, which may take four or five hours, the smoker may be left substantially unattended. There is no need for the cook to baste the meat or turn it, and, in fact, it is suggested that the cover not be removed during the cooking process inasmuch as this will result in an increased cooking time. When the meat is done, it may be removed and is ready for serving immediately. If desired, the meat, after it has been completely cooked, can be left in the cooker for a long period of time, keeping it warm inasmuch as the cooking process is a low heat process.

The advantages to the use of the electrical heating element are obvious. There is no need for the cook to charge the unit with a fuel such as charcoal and incur the difficulties of lighting a fire to cook the food. The unit is portable and may be used indoors and outdoors and is highly adaptable and may be used to cook a small quantity of meat or a larger quantity, using both grills. The internal components are easily removable for cleaning. The wood chip containing tray is easily fillable with desird aromatic, smoke producing chips and is nestable within the heating element for efficient combustion of the wood chips. The design of the unit providing for controlled upward ventilation through the unit helps to maintain the proper cooking conditions.

It will be seen, therefore, that the present invention provides a smoker which is highly efficient and serves to easily and effectively smoke meats and other foods with a highly desirable moist, smoked cooking method.

Modifications and changes to the present invention will occur to those skilled in the art, it being understood and intended that the present invention is to be limited only by fair interpretation of the appended claims.

I claim:
1. A cooking device comprising:
   a housing member having an open top and a substantially flat bottom, said housing supported on legs with the bottom portion in spaced relationship with the ground,
   a removable cover member cooperable with said housing member to enclose same,
   bracket means disposed on the interior wall of said housing,
   a pan having a peripheral flange adapted to be removably supported at said bracket means,
   cooking rack means having an edge adapted to removably support said rack at said brackets at an elevation above said pan,
   heating means including a resistance heating element disposed in said housing and supported from said housing at an elevation above said floor, said element having at least several spaced apart parallel sections,
   a removable tray adapted to contain smoke generating material, said tray having leg members adapted to support the tray a predetermined distance above said element, said legs being positioned relative to said element to permit placement of said tray directly above said element in nestable relationship therewith without interfering contact, and
   ventilation means including lower aperture means and upper aperture means in said housing whereby a flow of air is induced through said smoker from the bottom upwardly to carry away excess smoke and moisture.

2. The cooking device of claim 1 wherein said heating element is of a generally "W" shape and said tray legs are arranged to support said tray generally within the confines of said element.

3. The cooking device of claim 1 wherein said housing is generally cylindrical and said upper aperture means comprises an annular space defined between said housing and said cover and said lower aperture comprises a vent hole in said housing adjacent the heating element.

4. The cooking device of claim 3 wherein said bracket means comprises a set of cooperable brackets having an upper radially inwardly extending first flange and a lower radially inwardly extending flange, said lower flange vertically spaced apart from said upper flange whereby said rack is supportable at said first flange and said pan is supported at said second flange.

5. The cooking device of claim 4 wherein an insulating pad is removably secured to the exterior side of said flat housing bottom to minimize the heat effect from said element through said floor and wherein said bottom is configured having predetermined openings around the periphery.

6. The cooking device of claim 5 wherein said insulating pad is porous to permit infiltration of air into said housing through said predetermined openings.

* * * * *

Dedication

3,776,127.—*Edward T. Muse*, Dallas, Tex. ELECTRIC MEAT SMOKER. Patent dated Dec. 4, 1973. Dedication filed Apr. 1, 1977, by the assignee, *Smoker Products, Inc.*

Hereby dedicates to the Public the remaining term of said patent.

[*Official Gazette May 24, 1977.*]